United States Patent
Suciu et al.

(10) Patent No.: US 10,302,014 B2
(45) Date of Patent: May 28, 2019

(54) MODIFYING A GAS TURBINE ENGINE TO USE A HIGH PRESSURE COMPRESSOR AS A LOW PRESSURE COMPRESSOR

(71) Applicant: United Technologies Corporation, Hartford, CT (US)

(72) Inventors: Gabriel L. Suciu, Glastonbury, CT (US); Wesley K. Lord, South Glastonbury, CT (US); Brian D. Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 1390 days.

(21) Appl. No.: 14/598,269

(22) Filed: Jan. 16, 2015

(65) Prior Publication Data

US 2016/0208689 A1  Jul. 21, 2016

(51) Int. Cl.
*F02C 3/06* (2006.01)

(52) U.S. Cl.
CPC ............ *F02C 3/06* (2013.01); *F05D 2230/80* (2013.01)

(58) Field of Classification Search
CPC ................ F05D 2230/80; F02C 3/06
See application file for complete search history.

(56) References Cited

U.S. PATENT DOCUMENTS

| 2,803,943 | A | * | 8/1957 | Rainbow | F02C 7/32 60/262 |
|---|---|---|---|---|---|
| 4,645,416 | A | | 2/1987 | Weiner | |
| 6,685,425 | B2 | | 2/2004 | Poccia et al. | |
| 7,762,086 | B2 | * | 7/2010 | Schwark | F02C 7/20 60/796 |
| 2013/0186060 | A1 | * | 7/2013 | Kosheleff | F02K 3/06 60/224 |

* cited by examiner

*Primary Examiner* — Richard A Edgar
(74) *Attorney, Agent, or Firm* — Carlson, Gaskey & Olds, P.C.

(57) ABSTRACT

A method comprises the steps of modifying an existing engine which includes a high pressure compressor driven by a high pressure turbine and a low pressure turbine to drive a low pressure compressor. The modifying step includes utilizing the high pressure compressor as a low pressure compressor in a modified gas turbine engine, and designing and incorporating a new high pressure compressor downstream of the low pressure compressor section in the modified engine, such that a portion of the design of the existing engine is utilized in the modified engine. A gas turbine engine is also disclosed.

4 Claims, 3 Drawing Sheets

MODIFYING A GAS TURBINE ENGINE TO USE A HIGH PRESSURE COMPRESSOR AS A LOW PRESSURE COMPRESSOR

BACKGROUND OF THE INVENTION

This application relates to the overhaul of an existing gas turbine engine to provide a new gas turbine engine with a high overall pressure ratio across a pair of compressor sections.

Gas turbine engines are known and, typically, include a fan delivering air into a compressor as core airflow and delivering air into a bypass duct as bypass air for propulsion. The air is compressed in the compressor and delivered into a combustion section where it is mixed with fuel and ignited. Products of this combustion pass downstream over turbine rotors, driving them to rotate and, in turn, drive the compressor and fan rotors.

It is typically the case that there are at least two turbine rotors, with a higher pressure turbine rotor driving a higher pressure compressor rotor and a lower pressure turbine rotor driving a lower pressure compressor rotor.

Historically, a fan rotor was driven at the same speed as a turbine rotor. In one type of gas turbine engine, this was at the same speed as the low pressure compressor and low pressure turbine. In a second type of gas turbine engine, a third turbine rotor drove the fan rotor.

More recently, the assignee of this application has developed gas turbine engines with a gear reduction placed between a turbine rotor and the fan rotor. This allows the fan rotor to rotate at slower speeds.

With this change, the bypass ratio can increase dramatically. This reduces the percentage of air being delivered as core airflow and puts a premium on the efficient use of the air being delivered into the compressor sections.

It is desirable to increase the pressure ratios across the low and high pressure compressor rotors. However, there are limitations in that the temperature at the downstream end of the high pressure compressor rotor cannot be unduly high due to material challenges.

As can be appreciated, a good deal of engineering expense goes into designing compressor sections. With the advent of next generation gas turbine engines including a gear reduction for driving the fan, there will be any number of new engines coming to market. This will require a huge amount of engineering design, testing, manufacturing, and expense to design new compressor sections.

SUMMARY OF THE INVENTION

In a featured embodiment, a method comprises the steps of modifying an existing engine which includes a high pressure compressor driven by a high pressure turbine and a low pressure turbine to drive a low pressure compressor. The modifying step includes utilizing the high pressure compressor as a low pressure compressor in a modified gas turbine engine, and designing and incorporating a new high pressure compressor downstream of the low pressure compressor section in the modified engine, such that a portion of the design of the existing engine is utilized in the modified engine.

In another embodiment according to the previous embodiment, a fan is driven by a fan drive turbine through a gear reduction to provide bypass air into a bypass duct, and to provide air to the low pressure compressor in the modified engine.

In another embodiment according to any of the previous embodiments, a low pressure turbine, which drives the low pressure compressor in the modified engine, is the fan drive turbine.

In another embodiment according to any of the previous embodiments, a bypass ratio for the modified engine is greater than or equal to about 6.0.

In another embodiment according to any of the previous embodiments, the bypass ratio is greater than or equal to about 10.0.

In another embodiment according to any of the previous embodiments, a gear ratio for the gear reduction is greater than or equal to about 2.3:1.

In another embodiment according to any of the previous embodiments, an overall pressure ratio may be defined across the low pressure compressor and high pressure compressor in the modified engine, and the overall pressure ratio is greater than or equal to about 50.

In another embodiment according to any of the previous embodiments, the low pressure compressor in the new engine provides a pressure ratio of greater than or equal to about 15.

In another embodiment according to any of the previous embodiments, a gear ratio for the gear reduction is greater than or equal to about 2.3:1.

In another embodiment according to any of the previous embodiments, an overall pressure ratio may be defined across the low pressure compressor and high pressure compressor in the modified engine, and the overall pressure ratio is greater than or equal to about 50.

In another embodiment according to any of the previous embodiments, the low pressure compressor in the new engine provides a pressure ratio of greater than or equal to about 15.

In another embodiment according to any of the previous embodiments, an overall pressure ratio may be defined across the low pressure compressor and high pressure compressor in the modified engine, and the overall pressure ratio is greater than or equal to about 50.

In another embodiment according to any of the previous embodiments, the low pressure compressor in the new engine provides a pressure ratio of greater than or equal to about 15.

In another embodiment according to any of the previous embodiments, the low pressure compressor in the new engine provides a pressure ratio of greater than or equal to about 15.

In another featured embodiment, a gas turbine engine comprises a high pressure compressor driven by a high pressure turbine and a low pressure turbine driving a low pressure compressor and a fan rotor being driven by a fan drive turbine through a gear reduction/At least a portion of a high pressure compressor rotor is from an existing design of a prior engine being utilized as the low pressure compressor.

In another embodiment according to the previous embodiment, a fan is driven by a fan drive turbine through a gear reduction to provide bypass air into a bypass duct, and to provide air to the low pressure compressor.

In another embodiment according to any of the previous embodiments, the low pressure turbine is the fan drive turbine.

In another embodiment according to any of the previous embodiments, an overall pressure ratio may be defined across the low pressure compressor and high pressure compressor in the newly designed engine, and the overall pressure ratio is greater than or equal to about 50.

In another embodiment according to any of the previous embodiments, the low pressure compressor in the new engine provides a pressure ratio of greater than or equal to about 15.

In another embodiment according to any of the previous embodiments, the low pressure compressor in the new engine provides a pressure ratio of greater than or equal to about 15.

These and other features may be best understood from the following drawings and specification.

DETAILED DESCRIPTION

Figure 1:
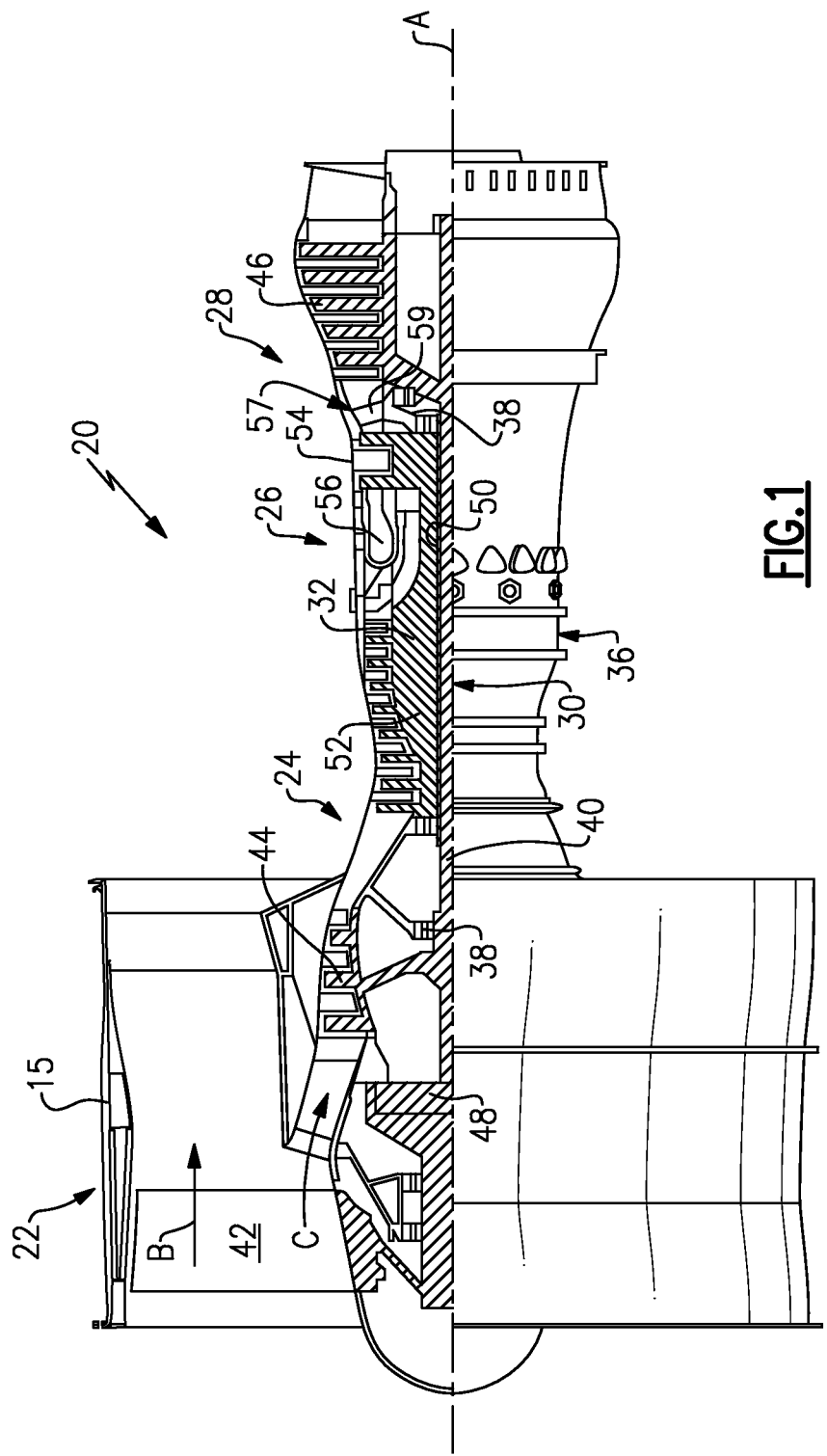
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
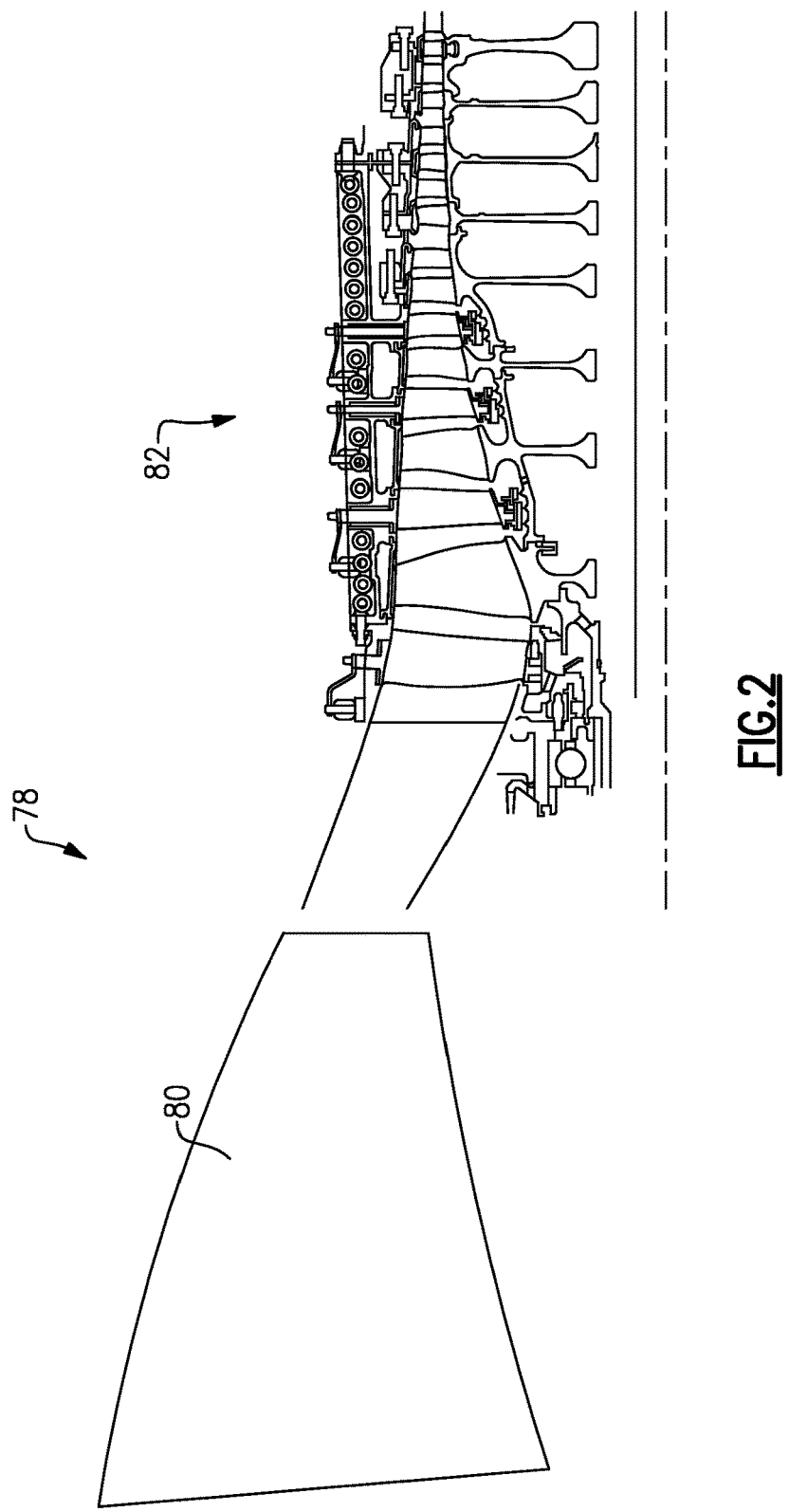
FIG. 2 shows an existing gas turbine engine.

FIG. 2 shows an existing engine 78. As shown, a low pressure compressor 80 receives air from a fan, such as the fan in FIG. 1, compresses that air and delivers it into the high pressure compressor 82. Downstream of the high pressure compressor, the compressed air is delivered into a combustion section, and the engine may operate such as shown in FIG. 1.

With the move toward high bypass ratio engines, the air delivered into the compressor section must be utilized as efficiently as is practical.

In addition, for many reasons, it is desirable to increase the overall pressure ratio across the compressor sections. Thus, it is expected that a number of new engines will be developed over the near term which provide high pressure ratios.

Figure 3:
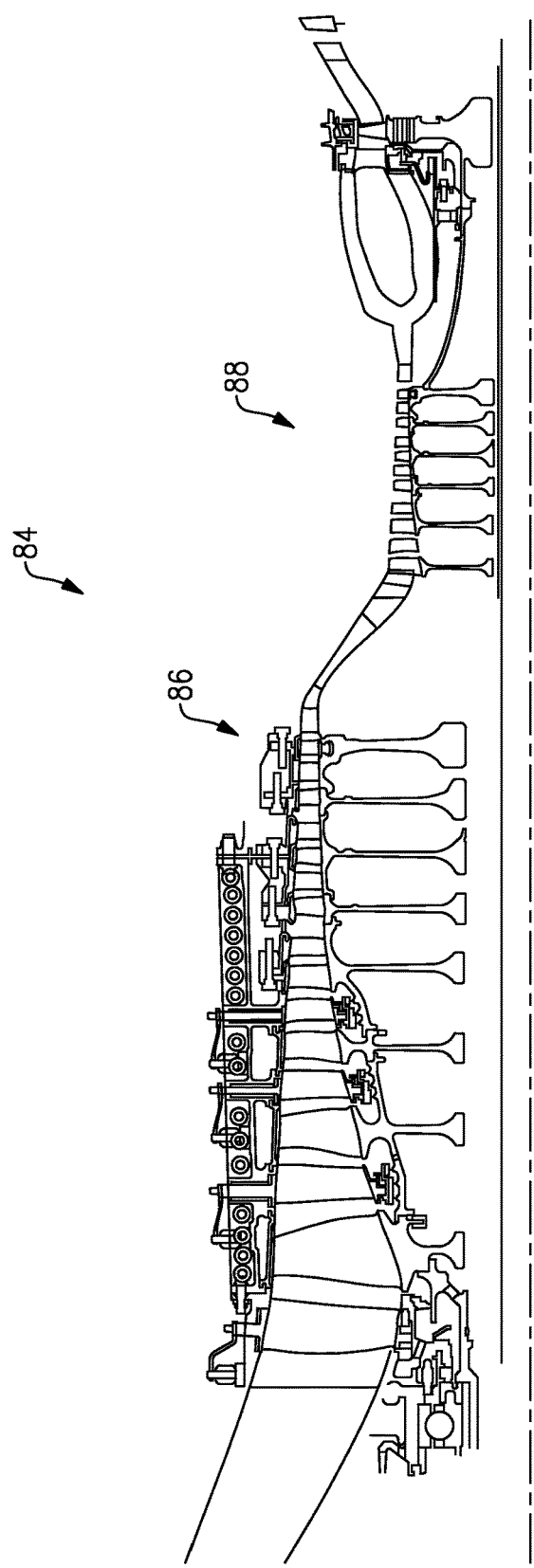
FIG. 3 shows a modified gas turbine engine.

However, each new engine platform requires a redesign. Rather than a complete redesign, engine manufacturers could modify existing engines and utilize existing components which have already been designed, tested, etc. As such, Applicant proposes to utilize the high pressure compressor 82 of the engine 78 in an overhaul type procedure to provide an engine 84 such as shown in FIG. 3. The low pressure compressor 86, downstream of the fan rotor, is effectively identical to the high pressure compressor 82, which has already been designed. A new high pressure compressor 88 must be designed to be downstream of the low pressure compressor 86. With such an arrangement, the prior high pressure compressor 82, now utilized as a low pressure compressor 86, may provide a greater portion of an overall compressor ratio, such that the new high pressure compressor section 88 need only perform a lesser part of the compressor ratio.

Thus, the temperature downstream of the last stage of the high pressure compressor 88 will not raise the challenges that it has in the past. The temperature may still be just as high, but the new high pressure compressor 88 can be designed to handle it.

A method disclosed in this application could be described as including the steps of modifying an existing engine 78 which includes a high pressure compressor 82 driven by a high pressure turbine and a low pressure compressor 80 driven by a low pressure turbine. The method further includes the modifying step of utilizing the existing high pressure compressor as a low pressure compressor in a new engine 84. A new high pressure compressor 88 is designed and included.

The redesigned engine of FIG. 3 is particularly useful with high overall pressure ratio engines wherein the compressor sections, in combination, generate a pressure ratio of greater than or equal to about 50. More narrowly, the pressure ratio is greater than or equal to about 60. In embodiments, the low pressure compressor rotor will generate a pressure ratio greater than or equal to 15. The high pressure compressor will generate a pressure ratio of greater than or equal to about 3.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method comprising the steps of:
   modifying an existing engine which includes a high pressure compressor driven by a high pressure turbine and a low pressure turbine to drive a low pressure compressor; and
   the modifying step includes utilizing the high pressure compressor as a low pressure compressor in a modified gas turbine engine, and designing and incorporating a new high pressure compressor downstream of the low pressure compressor in the modified engine, such that a portion of the design of the existing engine is utilized in the modified engine.

2. The method as set forth in claim 1, wherein a fan is driven by a fan drive turbine through a gear reduction to provide bypass air into a bypass duct, and to provide air to the low pressure compressor in the modified engine.

3. The method as set forth in claim 2, wherein the low pressure turbine, which drives the low pressure compressor in the modified engine, is the fan drive turbine.

4. The method as set forth in claim 2, wherein a gear ratio for the gear reduction is greater than or equal to about 2.3:1.

* * * * *